(12) United States Patent
Jacobs et al.

(10) Patent No.: US 10,836,110 B2
(45) Date of Patent: Nov. 17, 2020

(54) METHOD AND SYSTEM FOR ORDERING EXPEDITED PRODUCTION OR SUPPLY OF DESIGNED PRODUCTS

(71) Applicant: Desprez, LLC, New London, NH (US)

(72) Inventors: James L. Jacobs, New London, NH (US); Steven M. Lynch, Hudson, NH (US)

( * ) Notice: Subject to any disclaimer, the term of this patent is extended or adjusted under 35 U.S.C. 154(b) by 0 days.

(21) Appl. No.: 16/106,347

(22) Filed: Aug. 21, 2018

(65) Prior Publication Data
US 2019/0202133 A1  Jul. 4, 2019

Related U.S. Application Data

(63) Continuation-in-part of application No. 14/929,102, filed on Oct. 30, 2015, now Pat. No. 10,073,439.
(Continued)

(51) Int. Cl.
| | |
|---|---|
| B29C 64/393 | (2017.01) |
| B33Y 10/00 | (2015.01) |
| B33Y 80/00 | (2015.01) |
| B33Y 50/02 | (2015.01) |
| G06F 30/17 | (2020.01) |
| G06F 30/20 | (2020.01) |
| G06F 119/18 | (2020.01) |

(52) U.S. Cl.
CPC ............ *B29C 64/393* (2017.08); *B33Y 10/00* (2014.12); *B33Y 50/02* (2014.12); *B33Y 80/00* (2014.12); *G06F 30/17* (2020.01); *G06F 30/20* (2020.01); *G06F 2119/18* (2020.01)

(58) Field of Classification Search
CPC ......... G06F 17/50; B33Y 80/00; B33Y 50/02; B33Y 10/00; B29C 64/393
See application file for complete search history.

(56) References Cited

U.S. PATENT DOCUMENTS

| | | | |
|---|---|---|---|
| 4,495,559 A | 1/1985 | Gelatt, Jr. et al. | |
| 5,117,354 A | 5/1992 | Long | |
| | (Continued) | | |

FOREIGN PATENT DOCUMENTS

| | | | |
|---|---|---|---|
| WO | 154476 A2 | 8/2001 | |
| WO | 171626 A2 | 9/2001 | |
| | (Continued) | | |

OTHER PUBLICATIONS

Defining Lead Time for APS Planning; http://t3.apptrix.com/syteline/Language/en-US/Other/Process/Defining_Lead_Time.htm.
(Continued)

*Primary Examiner* — Sheng-Bai Zhu
(74) *Attorney, Agent, or Firm* — Caldwell Intellectual Property Law

(57) ABSTRACT

A method carried out on a computer system for ordering and executing expedited production options. A user may submit a request for manufacturing a product defined by a 3D computer model. Systems described herein may then verify that the request is subject to an expedited production option and parse the 3D computer model to identify the processes required to manufacture the product. The product may then be manufactured with an expedited lead time that may vary as a function of the processes in question and the nature of the applicable expedited production option.

20 Claims, 8 Drawing Sheets

Related U.S. Application Data

(60) Provisional application No. 62/073,371, filed on Oct. 31, 2014.

(56) References Cited

U.S. PATENT DOCUMENTS

| | | | |
|---|---|---|---|
| 5,465,221 A | 11/1995 | Merat et al. | |
| 5,495,430 A | 2/1996 | Matsunari et al. | |
| 5,552,995 A | 9/1996 | Sebastian | |
| 5,570,291 A | 10/1996 | Dudle et al. | |
| 5,655,087 A | 8/1997 | Hino et al. | |
| 5,758,328 A | 5/1998 | Giovannoli | |
| 5,847,971 A | 12/1998 | Ladner et al. | |
| 5,870,719 A | 2/1999 | Maritzen et al. | |
| 5,937,189 A | 8/1999 | Branson et al. | |
| 6,031,535 A | 2/2000 | Barton | |
| 6,112,133 A | 8/2000 | Fishman | |
| 6,295,513 B1 | 9/2001 | Thackston | |
| 6,341,271 B1 | 1/2002 | Salvo et al. | |
| 6,343,285 B1 | 1/2002 | Tanaka et al. | |
| 6,611,725 B1 | 8/2003 | Harrison | |
| 6,647,373 B1 | 11/2003 | Calton-Foss | |
| 6,701,200 B1 | 3/2004 | Lukis et al. | |
| 6,750,864 B1 | 6/2004 | Anwar | |
| 6,834,312 B2 | 12/2004 | Edwards et al. | |
| 6,836,699 B2 | 12/2004 | Lukis et al. | |
| 6,859,768 B1 | 2/2005 | Wakelam et al. | |
| 6,922,701 B1 | 6/2005 | Ananian et al. | |
| 6,917,847 B2 | 7/2005 | Littlejohn et al. | |
| 7,006,084 B1 | 2/2006 | Buss et al. | |
| 7,058,465 B2 | 6/2006 | Emori et al. | |
| 7,079,990 B2 | 7/2006 | Haller et al. | |
| 7,085,687 B2 | 8/2006 | Eckenwiler et al. | |
| 7,089,082 B1 | 8/2006 | Lukis et al. | |
| 7,123,986 B2 | 10/2006 | Lukis et al. | |
| 7,134,096 B2 | 11/2006 | Brathwaite et al. | |
| 7,299,101 B2 | 11/2007 | Lukis et al. | |
| 7,305,367 B1 | 12/2007 | Hollis et al. | |
| 7,327,869 B2 | 2/2008 | Boyer | |
| 7,343,212 B1 | 3/2008 | Brearley et al. | |
| 7,359,886 B2 | 4/2008 | Sakurai et al. | |
| 7,366,643 B2 | 4/2008 | Verdura et al. | |
| 7,369,970 B2 | 5/2008 | Shimizu et al. | |
| 7,418,307 B2 | 8/2008 | Katircioglu | |
| 7,467,074 B2 | 12/2008 | Faruque et al. | |
| 7,496,487 B2 | 2/2009 | Wakelam et al. | |
| 7,496,528 B2 | 2/2009 | Lukis et al. | |
| 7,499,871 B1 | 3/2009 | McBrayer et al. | |
| 7,523,411 B2 | 4/2009 | Carlin | |
| 7,526,358 B2 | 4/2009 | Kawano et al. | |
| 7,529,650 B2 | 5/2009 | Wakelam et al. | |
| 7,565,139 B2 | 7/2009 | Neven, Sr. et al. | |
| 7,565,223 B2 | 7/2009 | Moldenhauer et al. | |
| 7,567,849 B1 | 7/2009 | Trammell et al. | |
| 7,568,155 B1 | 7/2009 | Axe et al. | |
| 7,571,166 B1 | 8/2009 | Davies et al. | |
| 7,574,339 B2 | 8/2009 | Lukis et al. | |
| 7,590,466 B2 | 9/2009 | Lukis et al. | |
| 7,590,565 B2 | 9/2009 | Ward et al. | |
| 7,603,191 B2 | 10/2009 | Gross | |
| 7,606,628 B2 | 10/2009 | Azuma | |
| 7,630,783 B2 | 12/2009 | Walls-Manning et al. | |
| 7,656,402 B2 | 2/2010 | Abraham et al. | |
| 7,689,936 B2 | 3/2010 | Rosel | |
| 7,733,339 B2 | 6/2010 | Laning et al. | |
| 7,747,469 B2 | 6/2010 | Hinman | |
| 7,748,622 B2 | 7/2010 | Schon et al. | |
| 7,761,319 B2 | 7/2010 | Gil et al. | |
| 7,822,682 B2 | 10/2010 | Arnold et al. | |
| 7,836,573 B2 | 11/2010 | Lukis et al. | |
| 7,840,443 B2 | 11/2010 | Lukis et al. | |
| 7,908,200 B2 | 3/2011 | Scott et al. | |
| 7,957,830 B2 | 6/2011 | Lukis et al. | |
| 7,979,313 B1 | 7/2011 | Baar | |
| 7,993,140 B2 | 8/2011 | Sakezles | |
| 8,000,987 B2 | 8/2011 | Hickey et al. | |
| 8,024,207 B2 | 9/2011 | Ouimet | |
| 8,140,401 B2 | 3/2012 | Lukis et al. | |
| 8,170,946 B2 | 5/2012 | Blair et al. | |
| 8,175,933 B2 | 5/2012 | Cook, Jr. et al. | |
| 8,180,396 B2 | 5/2012 | Athsani et al. | |
| 8,209,327 B2 | 6/2012 | Danish et al. | |
| 8,239,284 B2 | 8/2012 | Lukis et al. | |
| 8,249,329 B2 | 8/2012 | Silver | |
| 8,271,118 B2 | 9/2012 | Pietsch et al. | |
| 8,275,583 B2 | 9/2012 | Devarajan et al. | |
| 8,295,971 B2 | 10/2012 | Krantz | |
| 8,417,478 B2 | 4/2013 | Gintis et al. | |
| 8,441,502 B2 | 5/2013 | Reghetti et al. | |
| 8,515,820 B2 | 8/2013 | Lopez et al. | |
| 8,554,250 B2 | 10/2013 | Linaker | |
| 8,571,298 B2 | 10/2013 | McQueen et al. | |
| 8,595,171 B2 | 11/2013 | Qu | |
| 8,700,185 B2 | 4/2014 | Yucel et al. | |
| 8,706,607 B2 | 4/2014 | Sheth et al. | |
| 8,768,651 B2 | 7/2014 | Bhaskaran et al. | |
| 8,798,324 B2 | 8/2014 | Conradt | |
| 8,806,398 B2 | 8/2014 | Brathwaite et al. | |
| 8,830,267 B2 | 9/2014 | Brackney | |
| 8,849,636 B2 | 9/2014 | Becker et al. | |
| 8,861,005 B2 | 10/2014 | Grosz | |
| 8,874,413 B2 | 10/2014 | Mulligan et al. | |
| 8,923,650 B2 | 12/2014 | Wexler | |
| 8,977,558 B2 | 3/2015 | Nielsen et al. | |
| 9,037,692 B2 | 5/2015 | Ferris | |
| 9,055,120 B1 | 6/2015 | Firman | |
| 9,106,764 B2 | 8/2015 | Chan et al. | |
| 2001/0023418 A1 | 9/2001 | Suzuki et al. | |
| 2001/0047251 A1 | 11/2001 | Kemp | |
| 2002/0065790 A1 | 5/2002 | Oouchi | |
| 2002/0087440 A1 | 7/2002 | Blair et al. | |
| 2002/0099579 A1 | 7/2002 | Stowell et al. | |
| 2002/0107673 A1 | 8/2002 | Haller et al. | |
| 2002/0152133 A1 | 10/2002 | King et al. | |
| 2003/0018490 A1 | 1/2003 | Magers et al. | |
| 2003/0069824 A1 | 4/2003 | Menninger | |
| 2003/0078846 A1 | 4/2003 | Burk et al. | |
| 2003/0139995 A1 | 7/2003 | Farley | |
| 2003/0149500 A1 | 8/2003 | Faruque et al. | |
| 2003/0163212 A1 | 8/2003 | Smith et al. | |
| 2003/0172008 A1 | 9/2003 | Hage et al. | |
| 2003/0212610 A1 | 11/2003 | Duffy et al. | |
| 2003/0220911 A1 | 11/2003 | Tompras | |
| 2004/0008876 A1 | 1/2004 | Lure | |
| 2004/0113945 A1 | 6/2004 | Park et al. | |
| 2004/0195224 A1 | 10/2004 | Kanodia et al. | |
| 2005/0055299 A1 | 3/2005 | Chambers et al. | |
| 2005/0125092 A1 | 6/2005 | Lukis et al. | |
| 2005/0144033 A1 | 6/2005 | Vreeke et al. | |
| 2005/0171790 A1 | 8/2005 | Blackmon | |
| 2005/0251478 A1 | 11/2005 | Yanavi | |
| 2005/0273401 A1 | 12/2005 | Yeh et al. | |
| 2006/0085322 A1 | 4/2006 | Crookshanks | |
| 2006/0185275 A1 | 8/2006 | Yatt | |
| 2006/0229756 A1* | 10/2006 | Aiso | G06Q 10/06 700/99 |
| 2006/0253214 A1 | 11/2006 | Gross | |
| 2006/0274650 A1* | 12/2006 | Tyagi | H04L 47/2433 370/229 |
| 2007/0016437 A1 | 1/2007 | Elmufdi et al. | |
| 2007/0031024 A1* | 2/2007 | Albeck | G05B 19/41875 382/141 |
| 2007/0067146 A1 | 3/2007 | Devarajan et al. | |
| 2007/0073593 A1 | 5/2007 | Perry et al. | |
| 2007/0112635 A1 | 5/2007 | Loncaric | |
| 2007/0198231 A1 | 8/2007 | Walch | |
| 2008/0120086 A1 | 5/2008 | Lilley et al. | |
| 2008/0183614 A1 | 7/2008 | Gujral et al. | |
| 2008/0269942 A1 | 10/2008 | Free | |
| 2008/0281678 A1 | 11/2008 | Keuls et al. | |
| 2009/0058860 A1 | 3/2009 | Fong et al. | |
| 2009/0208773 A1 | 8/2009 | DuPont | |
| 2009/0296980 A1* | 12/2009 | Yi | G06K 9/20 382/100 |
| 2009/0299799 A1 | 12/2009 | Racho et al. | |

(56) References Cited

U.S. PATENT DOCUMENTS

| | | |
|---|---|---|
| 2009/0319388 A1 | 12/2009 | Yuan et al. |
| 2011/0040542 A1 | 2/2011 | Sendhoff et al. |
| 2011/0047140 A1 | 2/2011 | Free |
| 2011/0209081 A1 | 8/2011 | Chen et al. |
| 2011/0213757 A1 | 9/2011 | Bhaskaran et al. |
| 2012/0016678 A1 | 1/2012 | Gruber et al. |
| 2012/0072299 A1 | 3/2012 | Sampsell |
| 2012/0230548 A1 | 9/2012 | Calman et al. |
| 2012/0316667 A1 | 12/2012 | Hartloff |
| 2013/0055126 A1 | 2/2013 | Jackson |
| 2013/0097259 A1 | 4/2013 | Li |
| 2013/0100128 A1 | 4/2013 | Steedly et al. |
| 2013/0138529 A1 | 5/2013 | Hou |
| 2013/0144566 A1 | 6/2013 | De Biswas |
| 2013/0166470 A1 | 6/2013 | Grala et al. |
| 2013/0218961 A1 | 8/2013 | Ho |
| 2013/0293580 A1 | 11/2013 | Spivack |
| 2013/0297320 A1 | 11/2013 | Buser |
| 2013/0297460 A1 | 11/2013 | Spivack |
| 2013/0311914 A1 | 11/2013 | Daily |
| 2013/0325410 A1 | 12/2013 | Jung et al. |
| 2014/0042136 A1 | 2/2014 | Daniel et al. |
| 2014/0067333 A1 | 3/2014 | Rodney et al. |
| 2014/0075342 A1 | 3/2014 | Corlett |
| 2014/0098094 A1 | 4/2014 | Neumann et al. |
| 2014/0115598 A1* | 4/2014 | Matousek ............ G06F 9/5061 718/104 |
| 2014/0157579 A1 | 6/2014 | Chhabra et al. |
| 2014/0207605 A1 | 7/2014 | Allin et al. |
| 2014/0229316 A1 | 8/2014 | Brandon |
| 2014/0279177 A1 | 9/2014 | Stump |
| 2014/0379119 A1 | 12/2014 | Sciacchitano et al. |
| 2015/0055085 A1 | 2/2015 | Fonte et al. |
| 2015/0066189 A1 | 3/2015 | Mulligan et al. |
| 2015/0127480 A1 | 5/2015 | Herrman et al. |
| 2015/0234377 A1 | 8/2015 | Mizikovsky |

FOREIGN PATENT DOCUMENTS

| | | |
|---|---|---|
| WO | 2001077781 A2 | 10/2001 |
| WO | 2006086332 A2 | 8/2006 |
| WO | 2007067248 A2 | 6/2007 |
| WO | 2011139630 A1 | 11/2011 |
| WO | 2011140646 | 11/2011 |
| WO | 2013058764 A1 | 4/2013 |
| WO | 2014152396 A2 | 9/2014 |

OTHER PUBLICATIONS

"Quartiles." Mathisfun.com. Web. <https://www.mathsisfun.com/data/quartiles.html>. Archive. <https://web.archive.org/web/201009090 ll75 /http://www.mathsisfun.com/data/qua rtiles.htm l>.
Wu et al. Interactive 3D Geometric Modelers with 2D UI, 2002, State University of Campinas, www.dca.fee.unicamp.br, Sao Paulo, Brazil; 2002, 8 pages.
"Upload Your Photos, Print a 3D Model with hypr3D." SolidSmack. http://www.solidsmack.com/cad-design- news/hypr3d-photo-video- 3d-print/; last accessed on Oct. 13, 2015.
"123D Catch." Autodesk. http://apps.123dapp.com/catch/.
Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.
Dealer Information Systems Corporation. "Parts Inventory." http://dis-corp.com/content/agriculture/inventory/parts-inventory.
eMachineShop. "Emachineshop Features." http://www.emachineshop.com/machine-shop/Features/page51 8.html.
Retrieved from:http://www.solidworks.com/sw/products/3d-cad/manufacturing-cost-estimation-quoting.htm p. 1:Automatic Manufacturing Cost Estimation Overview; Solidworks; 2015.
Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.
http://citeseerx.ist.psu.edu/viewdoc/download?doi=10.1.1.194.7785&rep=repl &type=pdf Kim, Jin Baek, and Arie Segev. "A web services-enabled marketplace architecture for negotiation process management." Decision Support Systems 40.1 (2005): 71-87.
Jaiswal, Ashutosh et al., "Design and Implementation of a Secure Multi-Agent Marketplace", Elsevier Science, pp. 1-23, Jun. 3, 2004; http://magnet.cs.umn.edu/pa pers/Ja iswa104cera .pdf.
http://www.com puter.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05.
http://www.bridge linedigita l.com/File%20 Library/Repository /eCommerce/Sa mple-eCommerce- RFP-Template_ Bridgeline-Digital. pdf. Sample RFP Template: Ecommerce Platform, Bridgeline Digital, 2014.
Matchbook, Tealbook, http://www.matchbookinc.com/ Sep. 28, 2015.
3Diligent, Source Smarter, http://www.3diligent.com/customer.html; Sep. 28, 2015.
Dassault Systemes, Brochure, Mar. 24, 2010: New Features Type3ToCatia http://www.type 3.us/content/download/2202/405535/file/New%20 Feature_Type 3ToCatia_ 2010_ US%2Dold.pdf.
Xue, S., X. Y. Kou, and S. T. Tan. "Natural voice-enabled CAD: modeling via natural discourse." Computer-Aided Design and Applications 6.1 (2009): 125-136.
Kou, X. Y., S. K. Xue, and S. T. Tan. "Knowledge-guided inference for voice-enabled CAD." Computer-Aided Design 42.6 (2010): 545-557.
Sharma, Anirudh, et al. "MozArt: a multimodal interface for conceptual 3D modeling." Proceedings of the 13th international conference on multimodal interfaces. ACM, 2011.
Sorpas ("User Manual,", Swanted Software and Engineering Aps, 2011 (120 pages)).
U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

| Supplier 1 | | | | |
|---|---|---|---|---|
| Item | Setup Time Per Operation (minutes) | Run Time Per Operation per unit (minutes) | | $ per hour (standard) |
| Operation 1 208A | 13.5 | 0.05 | | 110 |
| Operation 2 208B | 2.25 | 0.125 | | 110 |
| Operation 3 208C | 2.25 | 0.1 | | 110 |
| Operation 4 208D | 3.0 | 0.5 | | 130 |
| Operation 5 208E | 15.75 | 0.20 | | 105 |
| Operation 6 208F | 10.75 | 0.4 | | 100 |
| | Standard | Expedited | | |
| Base Lead Time (days) 204 | 7 | 5 | | — |
| Quantity (days) 206 | 3 | 2 | | — |

FIG. 6

Supplier 1

| Item | Standard Setup Time Per Operation (minutes) | Standard Run Time Per Operation per unit (minutes) | $ per hour (standard) | $ per hour (expedited) | $ per hour (priority) | NOTES |
|---|---|---|---|---|---|---|
| Operation 1 | 13.5 | 0.05 | 110 | 150 | 220 | Do not expedite if additional charge >$50/hour |
| Operation 2 | 2.25 | 0.125 | 110 | 150 | 220 | |
| Operation 3 | 2.25 | 0.1 | 110 | 150 | N/A | |
| Operation 4 | 3 | 0.5 | 130 | 215 | 260 | |
| Operation 5 | 15.75 | 0.20 | 105 | N/A | N/A | |
| Operation 6 | 10.75 | 0.40 | 100 | 125 | 200 | |

METHOD AND SYSTEM FOR ORDERING EXPEDITED PRODUCTION OR SUPPLY OF DESIGNED PRODUCTS

CROSS-REFERENCE TO RELATED APPLICATIONS

This application is a continuation-in-part of U.S. Nonprovisional patent application Ser. No. 14/929,102, filed on Oct. 30, 2015, which claims priority to U.S. Provisional Patent Application Ser. No. 62/073,371, filed on Oct. 31, 2014, and titled "METHOD AND SYSTEM FOR ORDERING EXPEDITED PRODUCTION OR SUPPLY OF DESIGNED PRODUCTS." Each of U.S. Nonprovisional patent application Ser. No. 14/929,102 and U.S. Provisional Patent Application Ser. No. 62/073,371 is incorporated herein by reference in its entirety.

FIELD OF THE INVENTION

The present invention generally relates to the field of manufacture of products, and in particular to methods, systems, and software for enabling expedited production or supply of designed products.

BACKGROUND

Computer-aided design (CAD) programs are typically utilized to create, model, and optimize the design of a product or article for subsequent manufacture, typically by modeling a three-dimensional (3D) representation of the designed product. CAD programs typically include a user interface for enabling a user to input design requirements, constraints, required performance criteria, testing criteria, and required elements or materials. Once a product is designed, designers and affiliated businesspeople then need to consider where it will be manufactured or supplied. Typically such choices are based on available prices and delivery dates for a given quantity of product. In the prior art, vendors offer expedited shipping at an additional cost. However, none of the prior art solutions enable a user either to enter into an arrangement by which a given volume of manufacturing requests are expedited or to create expedited requests for manufacture that comply with such an arrangement.

SUMMARY OF THE DISCLOSURE

In one aspect, a method of enabling expedited manufacture of one or more instantiations of a structure modeled as a 3D computer model is implemented on one or more computer devices. The method includes displaying, by the one or more computer devices, to a user one or more user selectable expedited manufacturing reservation options for a plurality of requests for manufacture. The method includes prompting, by the one or more computer devices, the user to select one of the user selectable expedited manufacturing reservation options from among the one or more displayed. The method includes receiving, at the one or more computer devices, an expedited manufacturing reservation, wherein the reservation is applicable to a plurality of requests for manufacture. The method includes storing, at the one or more computer devices, the expedited manufacturing reservation. The method includes receiving, at the one or more computer devices, a request for manufacture of one or more instantiations of a structure modeled in an associated 3D computer model from a user. The method includes receiving, at the one or more computer devices, a first requirement, the first requirement including a material, dimension, or tolerance requirement from a user. The method includes automatedly comparing, via at least one of the one or more computer devices, one or more of the requests for manufacture and one or more aspects of the associated 3D computer model with the expedited manufacturing reservation. Comparing includes interrogating the associated 3D computer model. Comparing includes determining as a function of the interrogation, a second requirement, the second requirement including a material, dimension, or tolerance requirement for manufacturing the structure. Comparing includes at least one of the first requirement or the second requirement determined from interrogating the associated 3D computer model to a material, dimension, or tolerance requirement in the expedited manufacturing reservation. The method includes determining, via the one or more computer devices and as function of the automated comparing, whether the expedited manufacturing reservation is applicable to the request for manufacture. The method includes calculating, via at least one of the one or more computer devices, total time to complete the request for manufacture. The method includes presenting, via at least one of the one or more computer devices, the total time to complete the request for manufacture.

In another aspect, a method of enabling expedited manufacture of one or more instantiations of a structure modeled as a 3D computer model includes displaying, by the one or more computer devices, to a user one or more user selectable expedited manufacturing reservation options for a plurality of requests for manufacture. The method includes prompting, by the one or more computer devices, the user to select one of the user selectable expedited manufacturing reservation options from among the one or more displayed. The method includes receiving, at the one or more computer devices, an expedited manufacturing reservation, wherein the reservation is applicable to a plurality of requests for manufacture. The method includes storing, at the one or more computer devices, the expedited manufacturing reservation. The method includes receiving, at the one or more computer devices, a request for manufacture of one or more instantiations of a structure modeled in an associated 3D computer model from a user. The method includes receiving, at the one or more computer devices, a first material, dimension, or tolerance requirement from a user. The method includes automatedly comparing, via at least one of the one or more computer devices, one or more of the requests for manufacture and one or more aspects of the associated 3D computer model with the expedited manufacturing reservation. Comparing includes interrogating the associated 3D computer model. Comparing includes determining as a function of the interrogation, a second material, dimension, or tolerance requirement for manufacturing the structure. Comparing includes comparing at least one of the first material, dimension, or tolerance requirement and the second material, dimension, or tolerance requirement determined from interrogating the associated 3D computer model to a material, dimension, or tolerance requirement in the expedited manufacturing reservation. The method includes determining, via the one or more computer devices and as function of the automated comparing, whether the expedited manufacturing reservation is applicable to the request for manufacture. The method includes calculating, via at least one of the one or more computer devices, total time to complete the request for manufacture. The method includes storing, on at least one of the one or more computer devices, information in connection with the request for manufacture to expedite manufacture of one or more instantiations of the structure in accordance with the reservation when the expedited manufacturing reservation is applicable to the request for manufacture.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a set of tables illustrating exemplary standard production data and expedited production data;

FIG. 7 is a table illustrating an example of data that may be stored for each supplier listing their respective setup and run times for particular processes in accordance with an embodiment of the present disclosure.

DETAILED DESCRIPTION

Aspects of the present disclosure include methods, systems, and software for enabling expedited production or supply of designed products, which may be embodied in any of several ways. In some embodiments, various aspects of the methods, systems, and software disclosed herein may be included in a 3D computer modeling program, such as a CAD program. Additionally or alternatively, one or more of the methods, systems, and software disclosed herein may interact with a CAD product through an appropriate interface, such as an application program interface (API). Any code modules of the present disclosure that are integrated into an existing CAD product may be written in an applicable programing language for CAD products. A person of ordinary skill in the art will readily recognize that code sequences that work with CAD products through their APIs can be embodied in any computer programming language.

Herein, a "structure" (or the "product" that is designed) may be any object or part having a particular geometry. A 3D computer "model" may be a virtual representation of a structure and may be created using an appropriate CAD program and/or from image and/or video data. A "designer" or "user" may be the designer of a 3D computer model, a purchaser, an agent of the purchaser, a consumer, a home user, or a customer, among others. Examples of a structure include a piece of sheet metal, a solid cube, a cylindrical pipe, an injection molded plastic toy, an article of clothing such as a shirt made of cotton, and an assembly of various parts such as a motor vehicle, among others. A design may refer to a 3D computer model of a part or an assembly of 3D computer models of parts that may be a virtual representation of a particular structure and may be created using one or more appropriate CAD programs. Notably, while the present disclosure makes reference to 3D computer models for sheet metal products, aspects of the present disclosure can be applied to other types of products such as machined parts, 3D printed parts, discrete parts, and assemblies of parts, among others, as will be apparent to those of ordinary skill in the art after reading this disclosure in its entirety.

Figure 1:
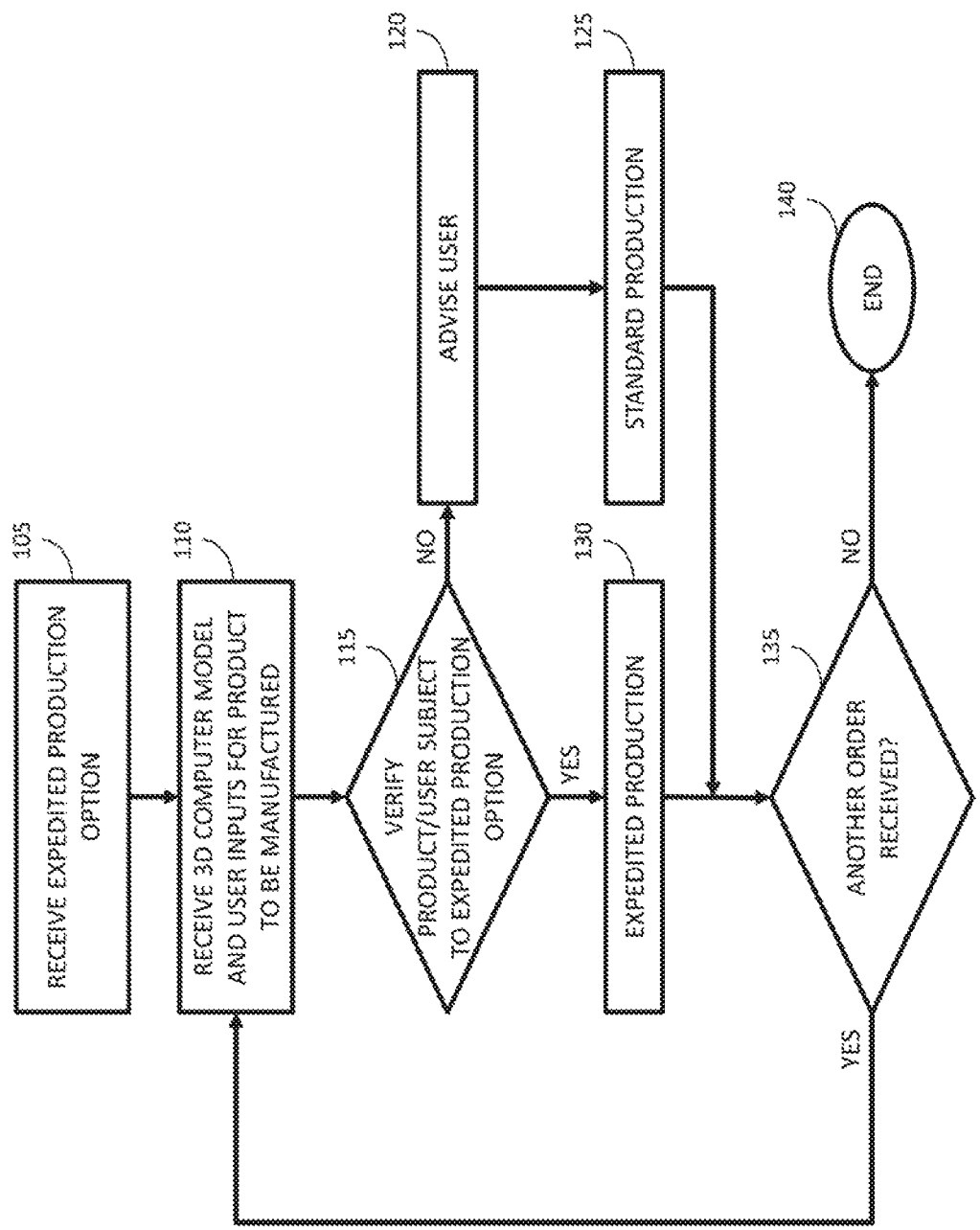
FIG. 1 is a high level flowchart depicting a method of expediting production in accordance with an embodiment of the present disclosure.

FIG. 1 depicts an exemplary method of expediting production. While certain aspects of the present disclosure will be described in further detail below, this high level description is provided for ease of understanding. At step 105 a system like that of FIG. 3 and/or FIG. 8 may receive an order for an expedited processing option (also referred to herein as an expedited manufacturing reservation) from a user. This order can take any of a number of forms. In some embodiments of the present disclosure, a user may pay a set price of $X per year for an expedited lead time option; the user may then be able to submit orders for up to Y different products per month, of a quantity not to exceed Z per product per month, where suppliers may determine Y and Z as a function of (i) their overall manufacturing capacity, (ii) the number of similar expedited manufacturing options they have previously granted (to attempt to ensure to the extent possible and or desired that foreseeable expedited orders will not exceed manufacturing capacity, which may involve analysis of individual user, company, or overall ordering history), and/or (iii) the set price $X. Although months, years, and other time periods are discussed herein, those of ordinary skill in the art will recognize, after reading this disclosure in its entirety, that other time periods, or even open-ended time periods, may be used. For example, a user may pay a set price per month, per week, or for life (e.g., the life of a user, a company, a product line, etc.), among others, for expedited lead time; similarly, expedited processing options may include limits on the number of products and/or quantity of such products that can be expedited on a monthly, weekly, annual, or other basis or may not include any limits whatsoever.

In some embodiments of the present disclosure, a user may submit orders of up to a total revenue $T or other dollar amount of product per year (or some other time period, as described above) in accordance with a particular expedited processing option; additionally or alternatively, a user may be provided with an expedited processing option for free or at a reduced cost as a result of having submitted a certain quantity or dollar amount of orders. Similarly, in some embodiments of the present disclosure, a supplier may offer an expedited manufacturing option as a sales incentive. For example, as an incentive for customers to purchase a total of $A of product over a time period of B, that customer may receive an expedited production option for a succeeding time period C after purchasing said total dollar amount of product optionally for not more than Y different products per month and/or of a quantity not to exceed Z per product per month, although other time periods may be used as discussed above. In some embodiments of the present disclosure, a user may pay $M towards expedited manufacturing, and charges associated with expediting each ordered product may be determined and applied against $M. In some embodiments of the present disclosure, an expedited production option includes a combination of the embodiments described above. So, for example, an expedited production option could include a flat fee component $X (that pays for a standard expedition of all ordered product) and an additional amount $M towards expedited manufacturing beyond the standard expedition, where the charges associated with supplemental expedition of each ordered product may be determined and applied against $M. Further, in some embodiments, a "premium expedite" feature may be available where a user may pay $2X or some other multiple or substantial increase over the standard charge for expedited manufacture, either up from or on a process-by-process basis, and in exchange they get all their ordered products expedited at a rate faster than the standard expedite rate, the limits on the number of ordered products Y may be waived, and/or the limits on the total quantity of products X may be waived. These and other models for expedited production options are further described herein and may be implemented using one or more aspects of the present disclosure.

At step 110, a user may provide a 3D computer model for an ordered product and optionally additional user inputs such as quantity required Q and other production options (such as a particular finish) that may not be specified in the 3D computer model; user inputs may include any information suitable for extraction from 3D computer model using interrogation as described herein, or any other information concerning any parameter or requirement for manufacture of ordered product. User inputs may include, without limitation, a first requirement. First requirement may specify anything that may be specified in any requirement as described or disclosed herein, including without limitation a material requirement, a dimension requirement, or a tolerance requirement. At step 115, the expedited production option of step 105 may be analyzed to determine whether it applies to the product ordered at step 110. This analysis may include a comparison of the identity of the user with a database or other data set identifying users that have current production order options and, in some embodiments, the requested quantity Q may be verified as being under a production limit Z. However, in some embodiments, step 110 may additionally or alternatively include a comparison of one or more aspects of the user-submitted 3D computer model, optionally determined via an interrogator like that further described hereinbelow, to one or more other data sets. For example, the user-submitted 3D computer model may be compared to 3D computer models of previously manufactured parts that may be stored in a warehouse or for which a mold may have already been manufactured and, in some embodiments, expedited production may be offered to the user free of cost or at a discounted rate. Further, aspects of the user-submitted 3D computer model may be compared with specifications of one or more expedited production options, which the user may or may not have already purchased, in order to determine eligibility of expediting production of structures defined by the 3D computer model. For example, one or more particular expedited production options may be limited to particular materials, dimensions, and/or tolerances, among others.

In some embodiments, if the user has not paid for an appropriate expedited production option and/or the quantity Q exceeds the production limit Z for the expedited production option in question, at step 120, the user may be advised that expedited production will not be performed. If it is possible to expedite production of structures defined by the 3D computer model but the user has not yet purchased the appropriate expedited production option, a user interface element enabling the user to purchase such an option may be presented. Although not shown in FIG. 1, if a user decides to purchase an expedited production option, the method of FIG. 1 may return to step 115 or proceed to step 130, as appropriate, after step 120. At step 125 standard manufacturing production may be carried out for the ordered product. Note that the step of comparing requested quantity Q to production limit Z may not apply in those instances or embodiments where there is no such production limit. With reference again to FIG. 1, if the user has paid for an appropriate expedited production option and, in some embodiments, if the requested quantity Q does not exceed any upper limit Z for expedited production, then at step 130 the product may be manufactured using expedited manufacturing processes like those discussed in more detail below. Additionally or alternatively, users may be advised in a variety of other ways at step 120. For example, a user-submitted 3D computer model may be interrogated, as described further hereinbelow, in order to determine whether best manufacturing practices are possible and/or whether one or more structures defined by the 3D computer model can, in fact, be expedited to the extent requested (e.g., in accordance with a particular expedited production option). If a 3D computer model cannot be manufactured using best manufacturing processes, a user may be advised accordingly at step 120 and, if desired and/or possible, the user may be presented with a prompt or other user interface element identifying the potential issues and inquiring as to whether they would like to proceed with manufacturing notwithstanding such issues. If one or more structures defined by the 3D computer model cannot be expedited to the extent requested, the user may be advised at step 120 that production cannot be expedited as requested and presented with a user interface element specifying why production cannot be expedited to the extent requested, providing an estimated ship date or lead time, and/or inquiring as to whether the user wishes to proceed with their order in spite of the fact that the order will not be able to be expedited to the extent requested.

Aspects of the present disclosure can be used to respond to pricing requests. Notably, in some embodiments, a request for manufacture is considered a pricing (or cost) request independent of an order the product. The user's request for manufacture may be only to obtain information such as pricing, lead-time, and/or quantity availability for purposes other than ordering such as budgeting or project feasibility and the user may not have any intention of ordering the structure. Once a pricing request is verified as subject to an expedite option, a price for manufacture including applying the expedite option may be provided to the user prior to actual manufacture. Aspects of the present disclosure can be used to generate pricing and associated lead times, applying the expedite option. At step 135, one or more systems of the present disclosure may determine whether another order has been received for a manufactured product. If it has not, the process may end at step 140; however, if it has, the process may repeat starting at step 110, with the exception that at step 115 the verification may not include verifying that the user has an active expedited production option, as that may have been verified previously, although other verifications may still be performed, as discussed above.

Figure 2:
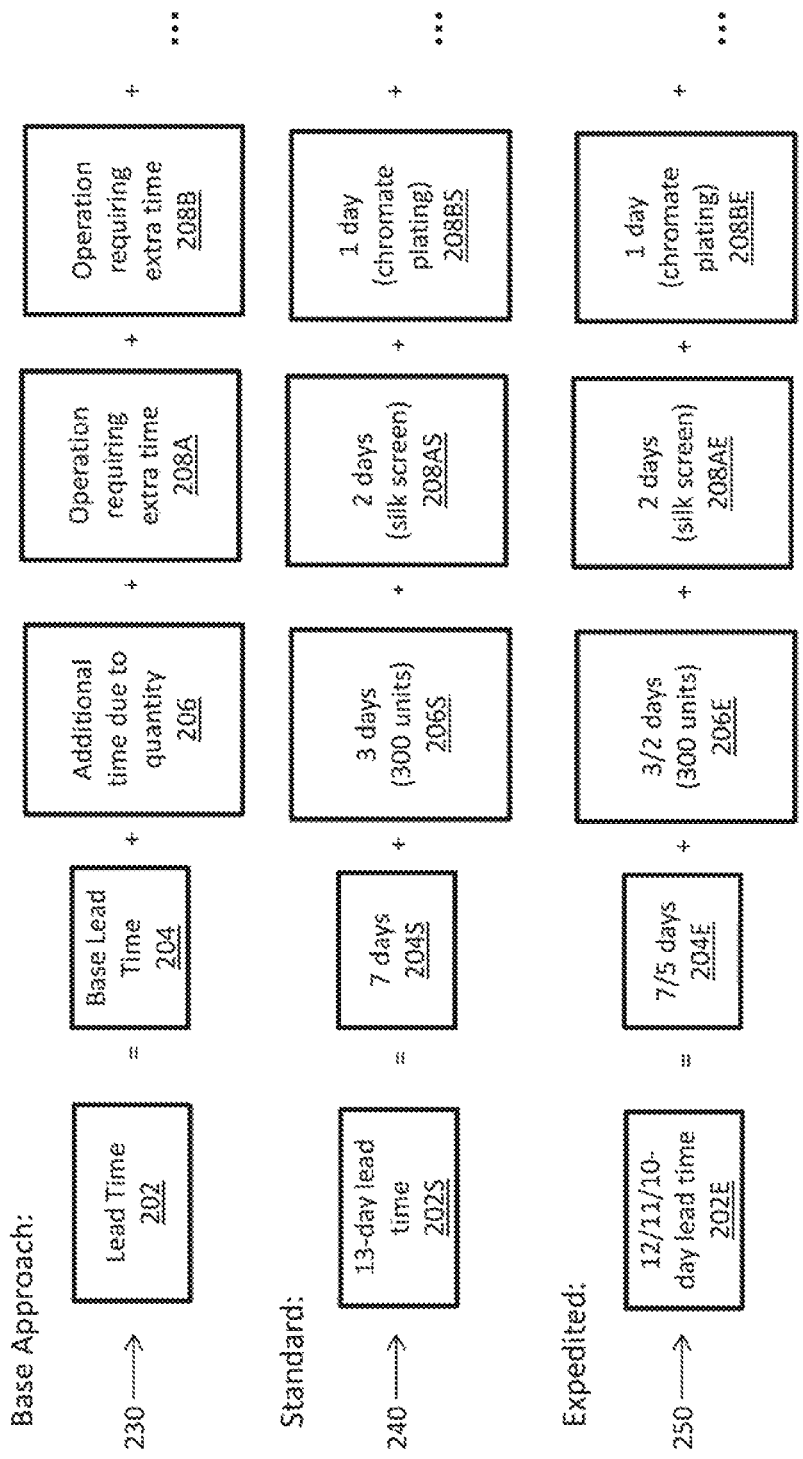
FIG. 2 is an explanatory block diagram depiction of overall manufacturing scheduling in accordance with an embodiment of the present disclosure.

FIG. 2 is a block diagram depiction of overall production scheduling in accordance with an embodiment of the present disclosure. In the description to follow, reference is made to "lead time," which is the amount of time between receipt of an order for one or more manufactured products and the products being ready for shipment. In some embodiments of the present disclosure, a lead time may include shipment time and may correspond to the total amount of time between a user submitting an order and the user's receipt of manufactured product. However, since shipment is typically arranged separately from manufacturing, shipment is not included in "lead time" in this example. By enabling users to expedite lead time separately from shipping time, a wider swath of manufacturing and logistics combinations can be considered and utilized in order to optimize price and efficiency.

As is shown by the first row of boxes 230, "lead time" 202 may be expressed as a total number of days, including the base production time (or "base lead time") 204 to manufacture the product, additional time due to the quantity of product ordered 206, and additional time due to operations that are unique to the ordered product and will take extra time 208A, 208B. Base production time 204 may be simply the amount of time that it generally takes for the supplier to manufacture a default quantity of a particular type of good, which may include both raw process time (how much time it may take to conduct the manufacturing operations if there were no other products to be manufactured) and capacity load (the extra dwell times between manufacturing steps for a given product, which may assume a given level of available manufacturing capacity due to other parts in production). As a practical matter, base lead time 204 may vary with the amount and type of operations required for a particular type of product and available capacity. So, for example, the base lead time for a sheet metal box that requires one cutting operation, five folding operations, and one soldering operation could be determined to be 7 days for a default quantity of 100 units and a default available capacity. The base lead time for a plastic box that requires a molding operation and a drilling operation might be 4 weeks for a default quantity of 50 units and a default available capacity. In some embodiments, "available capacity" in this calculation might be set to a value less than actual available capacity, so as to afford the manufacturer some margin in how they allocate capacity. However, in other embodiments, this "available capacity" may be set to a value greater than actual available capacity, as manufacturers may be able to deal with exceeding their standard manufacturing capacity by, for example, expanding capacity on demand (e.g., buying new production machines) and/or enlisting partner companies to help with production, among others.

Box 206 indicates additional time that may be required for quantities beyond the "default quantities" listed above. So if instead of the default quantity of 100 units, the buyer requests 300 units, an additional 3 days may be included in the calculation of lead time. Finally, boxes 208A, 208B indicate additional time required for special processes that are beyond the default calculation set forth above. More or fewer special processes may be required, as represented by the plus sign and the ellipsis to the right of box 208B.

Row 240 sets forth an example application of a base approach to determine standard lead time 202S. Per the first example above, in box 204S, the base lead time may be calculated as 7 days for a default quantity of 100 units and a default available capacity. In box 206S, 3 additional days are added because the buyer requests a quantity of 300 units, rather than the default quantity of 100 units that was the basis of the calculation of the value of box 204S. In box 208AS, 2 additional days are added due to requested silk screen printing for all 300 units, where silk screening is a process that was not included in the calculation of base lead time for manufacture of this type of product. In some embodiments, extra processes 208 can be due to required suppliers rather than requested operations. So, for example, the 2 day requirement 208AS for silk screening could be due to the manufacturer's use of a third party provider (in which case the 2 days may be due to shipment of product to the provider, execution of the silk screen operation, and return of the processed product from the provider to the primary manufacturer). In box 208BS, 1 additional day is added for a chrome plating operation that may not be accounted for in the default production operations that form the basis of the calculation of base lead time (box 204S).

Row 250 sets forth the application of the base approach to determine expedited lead times 202E, where "12/11/10" presents the three different options for providing expedited lead times in accordance with different embodiments of the present disclosure. For example, the base lead time 204E may be reduced from 7 days (in box 204S) to 5 days. This would result in a 2 day reduction in overall lead time, from 13 days (box 202S) to 11 days (box 202E), assuming no other components of lead time are reduced. In one example, the five day lead time may result from the manufacturer giving preference to the production of these products as compared to other products, such that total base lead time closer approximates raw process time. In another example, base lead time may average 4 days, so the manufacturer may simply allocate a base lead time of 5 days to the production of these products. In some embodiments, the additional time due to quantity may be reduced from 3 days (in box 206S) to 2 days. This would result in a one day reduction in overall lead time, from 13 days (box 202S) to 12 days (box 202E), assuming no other components of lead time are reduced. This reduction of 3 days to 2 days can be accomplished the same way base lead time was reduced per the example above. Finally, in some embodiments of the present disclosure, base lead time 204E may be reduced (from 7 to 5 days) and additional time due to quantity 206E may be reduced (from 3 days to 2 days). This would result in a 3 day reduction in overall lead time, from 13 days (box 202S) to 10 days (box 202E), assuming no other components of lead time are reduced. Note that in this example, additional time due to silk screening (208AE) and chromate plating (208BE) are the same as the standard times 208AS and 208BS, respectively. This simply indicates that some processes may not be subject to expediting, either due to third party suppliers (see the example discussed above for silk screening) or due to special requirements for the process in question.

In some embodiments, one or more of the additional processes 208A, 208B can be expedited along with base lead time 204 and normal delays due to quantity/load 206. Note also that a variety of methodologies may be applied to reconcile these different amounts of lead time reductions with different payment schedules. So, in its simplest form, a expedite option payment of $X may entitle the customer to a three-day reduction in lead time. Alternatively, the payment of $X might qualify the customer for a "standard" lead time reduction of two days (in other words, a reduction in just the base lead time 204), and a premium payment of $Y (e.g., either on some periodic basis and/or on a product by product ordering basis) may qualify the customer for an additional reduction of one day (e.g., by adding the one day reduction due to quantity 206). Other combinations of payments and corresponding reductions are possible, as will be explained in more detail below.

Figure 3:
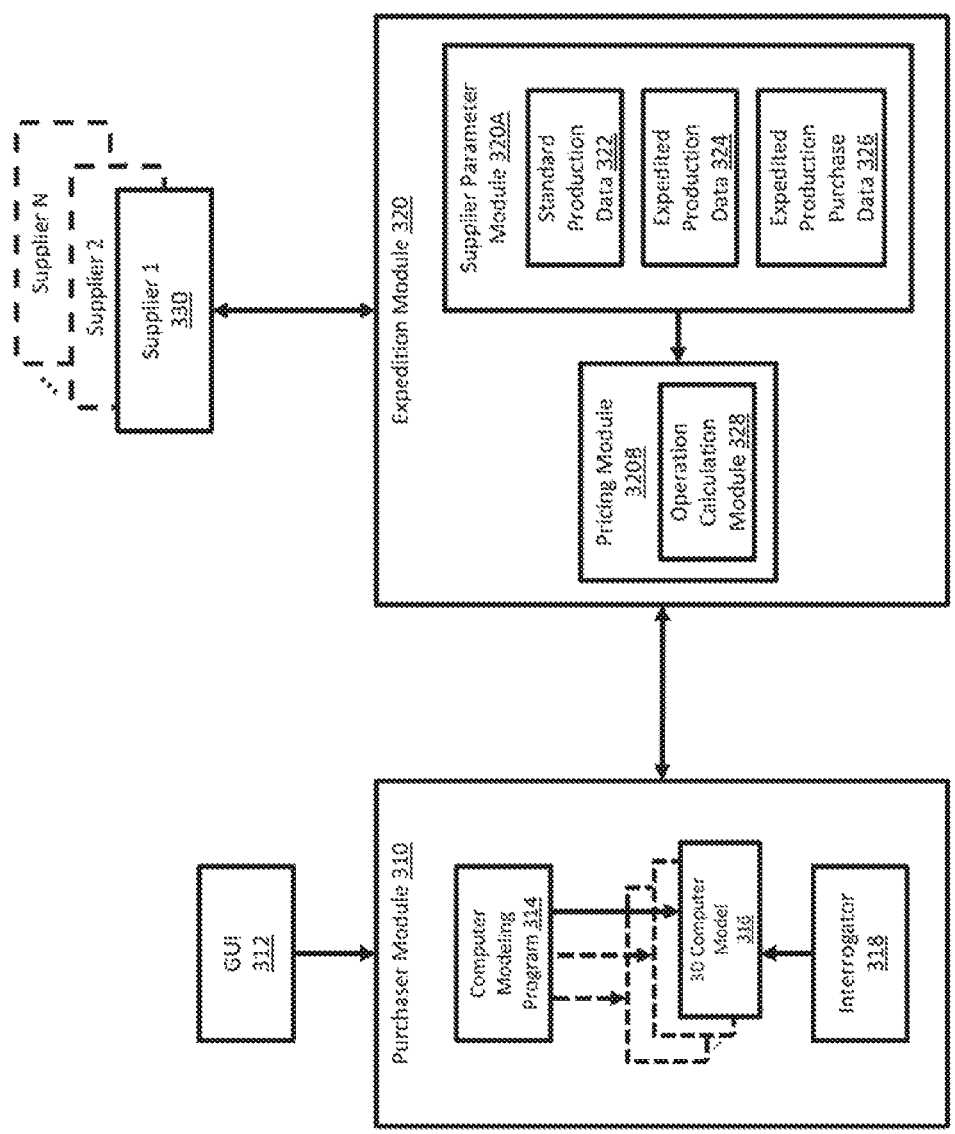
FIG. 3 is a block diagram of a computer control system in accordance with an embodiment of the present disclosure.

FIG. 3 shows a block diagram of a system that can be used to implement various aspects of the present disclosure. In the description to follow, reference is made to "blocks" of computer program code, or modules of code. It is to be understood that the reference to separate "modules" is for ease of illustration and discussion. As a practical matter, the program code instantiating aspects of the present disclosure could be organized in any of a number of manners to provide the functions described. While it is possible that separate code modules could be created to achieve the separate functions described, that is not required. So while various modules of the program of the present disclosure are described separately, in practice the actual modules of code instantiating the functions described for those separate modules could be intermingled—they do not have to be separate and independent sequences of code.

As shown in FIG. 3, one or more aspects of systems implemented in accordance with the present disclosure may be implemented in software and may include a purchaser module 310 and an expedition module 320. In some embodiments, one or more of modules 310, 320 may be implemented in the context of and/or accessed via price-quoting software, although in other embodiments such price-quoting software may be included in and/or accessed via purchaser module 310 and/or expedition module 320, as appropriate. User inputs to the purchaser module 310, and screen displays to enable those inputs, may be provided via a GUI 312. In practice, the GUI may be associated with a computer through which the user may control the purchaser module 310. However, in some embodiments, the GUI can be hosted by any computer system that can receive user inputs, ranging from a cellphone to a server system, among others. The purchaser module 310 may include a computer modeling program 314 that may have functionality similar or identical to 3D CAD programs known in the prior art for creating one or more 3D computer models 316 of a product design. The 3D computer models 316 may have information associated with them of a type sufficient to enable manufacturing of the designed product. The purchaser module 310 may also include an interrogator 318 that interrogates, or parses, the data from the 3D computer models 316 to identity components, processes, or other identifiable parts of the 3D computer model that can be used by expedition module 320 as described below to (i) identify the various materials, processes, dimensions, and/or tolerances required to manufacture the designed part and (ii) generate a calculated price (or price estimate or cost) for the CAD design under analysis. By way of example, the interrogator 318 may parse a 3D computer model 316 and determine the structure defined therein may require a particular number of drilled holes in and a particular number of bends of a 0.25 inch thick aluminum sheet. Those processes, along with other cutting, soldering, and other processes that may be required to manufacture the design, may be identified and provided to the operation calculation module 328 of expedition module 320 for further processing as described below. Illustrative embodiments for such an interrogator 318 may also be found in U.S. patent application Ser. No. 14/060,033, filed on Oct. 22, 2013, and titled "AUTOMATED FABRICATION PRICE QUOTING AND FABRICATION ORDERING FOR COMPUTER-MODELED STRUCTURES", which is incorporated by reference herein for its teachings of extracting pricing data from computer models, and U.S. patent application Ser. No. 14/282,773, filed on May 20, 2014, and titled "METHODS AND SOFTWARE FOR ENABLING CUSTOM PRICING IN AN ELECTRONIC COMMERCE SYSTEM", which is incorporated by reference herein for its teachings of particular interrogator engines.

In some embodiments, an interrogator, such as interrogator 318, may parse a 3D computer model to identify separate elements thereof by reading a combination of (a) specific commands issued by a CAD system and (b) specific routines or functions associated with such commands to determine whether they collectively define an individual element or portion (a "shape," "solid body," or "component") of a 3D computer model. Many CAD systems, including, by way of example, SolidWorks® (registered trademark of Dassault Systemes), include an application program interface (API) to enable a user to control the issuance of customized routines or functions associated with such commands. The interrogator may read such commands, routines, and functions to determine whether they define an individual shape, and, if so, may analyze various geometric aspects of the defined shape to determine whether such aspects correspond to one or more manufacturing requirements for a product to be manufactured based on a 3D computer model. If so, such requirements may be output from the interrogator as CAD data or interrogation data for processing and analysis by any one or more components of the present disclosure.

As a first step, an interrogator may identify discrete shapes in a 3D computer model. In an embodiment based on the SolidWorks CAD program, an interrogator may read the "FeatureManager Design Tree" (an outline representation of individual shapes) to determine the number of solid bodies (or shapes) in the design. Representations of individual shapes may be found in other CAD software files, and other CAD software systems may be used. In SolidWorks, one command usable to analyze the number of solid bodies is: object[ ]bodies=(object[ ])part.GetBodies2((int)Const.sw-BodyType_e.swSolidBody, false); and the output is a list of bodies. The foregoing code statement is listed by way of example only; other code statements or sequences could be used.

An interrogator may then analyze geometric aspects of such identified shapes and compare such aspects to corresponding manufacturing requirements. In an embodiment, these manufacturing requirements may include given starting materials. In other words, the interrogator may determine whether a given defined shape can be manufactured from a given starting material, based on one or more analyzed geometric properties of one or more identified shapes. If so, that starting material may be identified as a manufacturing requirement and may be included in CAD data generated by the interrogator. As a result, a pricing module, such as pricing module 320B, may read prices associated with such starting materials from a supplier database or other location to determine a given supplier's calculated price per unit for a product to be manufactured in accordance with such 3D computer model.

In an embodiment, an interrogator may determine whether a defined shape may be manufactured from a sheet metal part. In general, in order to be manufactured from sheet metal, a defined shape must have a uniform thickness. As will be apparent to a person of skill in the art, other geometric attributes may be analyzed to determine potential manufacturing requirements. By way of example, a given angle of bend may preclude use of certain starting materials. A given dimensional measurement may preclude certain starting materials. In an alternate embodiment, different geometric properties may be compared in combination to define manufacturing requirements. For example, a given shape may have a uniform thickness (such that it could be manufactured from two different types of sheet metal, such as copper or aluminum), be 0.50" thick, and include bends of over 45 degrees (which may preclude the use of a copper sheet, because various types of copper, depending, on composition, may not be bendable at 45 degrees at a 0.50" thickness).

In some embodiments, in order to determine whether a given shape has a uniform thickness, an interrogator may first execute the "GetBoundingBox" SolidWorks API command. The resulting output may be an array of X, Y and Z extents, for example:

XCorner1,YCorner1,ZCorner1

XCorner2,YCorner2,ZCorner2

In some embodiments, a part may not be oriented so that its thickness is represented by the Z dimension (i.e., the part is lying flat) but instead by a X or Y dimension. This may be the case where an interrogator needs to determine whether sheet metal can be used to fabricate the part. However, if an interrogator analyzes the x,y plane, then it may not be able to reliably identify each portion of the part that can be fabricated from sheet metal; by also analyzing the z dimension, the interrogator may reliably identify all sheet metal parts. An interrogator may determine which dimension represents thickness by determining distance between corners. Thickness may be represented by the shortest distance, as follows:

$abs$[XCorner1−XCorner2]=Variable X $abs$[YCorner1−YCorner2]=Variable Y $abs$[ZCorner1−ZCorner2]=Variable Z For this example, if Variable X has the lowest value of the three results, it may represent the thickness of a 3D computer model. If that is the case, width and length of the 3D computer model may then be calculated as Width=$abs$[YCorner1−YCorner2]

Length=$abs$[ZCorner1−ZCorner2]

Given these calculations, the interrogator may determine that a workpiece has a uniform thickness if all of the following statements are true: the 3D computer model must have at least one solid body; all of the vertexes of the solid body faces that are perpendicular to the base plane are also equal to the thickness value (Variable X in this example); no vertex edge length is less than the thickness value; and the perimeter of the top face is equal to the perimeter of the bottom face. This may be determined through the following code, which finds the perimeter for each face. The values of the faces are then compared and if they are equal, the output is true.

```
double getPerimeter(IFace2 face)
{
var edges = face.GetEdges( ) as object[ ];
double perimeter = 0;
foreach (IEdge edge in edges)
if (edge != null)
perimeter += edge.GetLength(SwApp);
return perimeter;
}
```

The foregoing code statements are listed by way of example only; other code statements or sequences could be used. If the results are all true, the analyzed shape of the 3D computer model may represent a workpiece of uniform thickness. As such, an interrogator may conclude that the analyzed shape may be fabricated from a single sheet metal part. Accordingly, by way of example, "sheet metal" may be included in CAD data as a manufacturing requirement, which may cause a pricing module to read prices for sheet metal parts (versus prices for plastics or other materials) from a supplier database or elsewhere. As a result, a pricing module may determine a given supplier's calculated price per unit for a product to be manufactured in accordance with such manufacturing constraints as automatedly determined by an interrogator.

The "uniform thickness" determination set forth above, as well as the attendant height, length, and thickness measurements, may be used to enable other comparisons between manufacturing requirements and supplier attributes. For example, once the use of a sheet metal workpiece has been confirmed as set forth above, a capabilities engine may query stored supplier data for any one of length, width, thickness, or any other supplier constraints for sheet metal parts. An example of a potential supplier constraint that would be determined by the nature of the starting workpiece material is as follows. For mechanical hole punching for sheet metal parts, a press brake may form predetermined bends in a workpiece by clamping it between a matching punch and a die. A press brake may include a bed for supporting the workpiece between the punch and the die. However, press brakes cannot typically bend parts longer than the length of the bed. If a given supplier uses a press brake having a maximum bed length of eight feet, utilizing the process as set forth above, an interrogator may determine that a defined shape of a 3D computer model has a length of ten feet. In this case, a pricing module may not calculate pricing for that supplier because that supplier is unable to meet one of the manufacturing requirements imposed by the 3D computer model. In some embodiments, expedition module 320 may utilize outputs from interrogator 318 to determine whether one or more components of an order can be expedited, as described herein. For example, in some embodiments, operation calculation module 328 may automatedly compare one or more requests for manufacture and one or more aspects of a 3D computer model (optionally received or derived from interrogator 318 output) with an expedited manufacturing reservation and determine, as a function of the automated comparing, whether the expedited manufacturing reservation is applicable to the request for manufacture. As a non-limiting example, interrogator 318 may interrogate associated 3D computer module, and expedition module 320, interrogator 318, and/or another module disclosed herein may determine a requirement, which may include without limitation a material, dimension, or tolerance requirement, for manufacturing the structure as a function of the interrogation; expedition module 320, interrogator 318, and/or another module disclosed herein may compare requirement determined from interrogating the associated 3D computer model to a requirement, which may include without limitation a material, dimension, or tolerance requirement, in the expedited manufacturing reservation. System, or any module thereof, may determine, via the one or more computer devices and as function of the automated comparing, whether the expedited manufacturing reservation is applicable to the request for manufacture. Alternatively or additionally, where a requirement, which may include without limitation a material, dimension, or tolerance requirement, is input by a user, expedition module 320, interrogator 318, and/or another module disclosed herein may compare requirement input by the user to a requirement, which may include without limitation a material, dimension, or tolerance requirement, in the expedited manufacturing reservation. Comparing may include comparing at least one of a first requirement including a user input, which may include without limitation a material requirement, a tolerance requirement, or a dimension requirement and a second requirement obtained via interrogation of 3D computer model, where the second requirement may include without limitation a material requirement, a dimension requirement, and/or a tolerance requirement, with a material, dimension, or tolerance requirement of expedited request, where comparing at least one of first requirement and second requirement with material, dimension, or tolerance requirement of expedited request may include comparing first requirement with the material, dimension, or tolerance requirement of expedited request, comparing second requirement with the material dimension or tolerance requirement of expedited request, or both. In an embodiment, and as a non-limiting example, first requirement may include a first category of requirement, such as without limitation a material requirement, and second requirement may include a second category of requirement, such as without limitation a tolerance requirement, and comparing may include comparing the first requirement to a material, tolerance, or dimension requirement, belonging to first category, of expedited manufacturing request and comparing the second requirement to a material, tolerance, or dimension requirement, belonging to second category, of expedited manufacturing request; thus, a user-entered material requirement may be compared to a material requirement of expedited manufacturing request, while a tolerance requirement obtained via interrogation of 3D computer model may be compared to a tolerance requirement of expedited manufacturing request. In an embodiment, first category is distinct from second category; first category and second category may alternatively or additionally not be distinct from each other. Any other combination of user-entered and/or interrogated requirements to any requirements of expedited manufacturing request may alternatively or additionally be performed consistently with this method. Furthermore, first requirement and/or second requirement may be compared to any other requirement set forth in or derived from expedited manufacturing request. Following comparison and/or determination of applicability, information may then be displayed to a user indicating the total time to complete the request for manufacture.

The expedition module 320 may include a supplier parameter module 320A and a pricing module 320B. The supplier parameter module 320A may comprise a database (with associated control code, where necessary) that may store, for example, three or more types of information: standard production data 322, expedited production data 324, and expedited production purchase data 326. The supplier parameter module 320A may be any relational database product that can provide the organization of information set forth below. The standard production data 322 sets forth the lead time and associated price for the various manufacturing operations supported by a given supplier. In essence, this may be the information illustrated in row 240 in FIG. 2, broken down into lead time by individual process and associated price. The expedited product data 324 may set forth processes that can be expedited by lead time (which may be less than the lead time for the same process stored in standard product data 322) and associated (e.g., higher) price. In essence, this may be the information illustrated in row 250 of FIG. 2, again in more granular form. Note that this information may be listed separately for each supplier (Supplier 1, Supplier 2, . . . , Supplier N) 330, because different suppliers may have different processes they support and different lead times and prices associated with those processes. In an embodiment, this information may be provided by each supplier as part of the initial or continuing configuration of the system; however, the present disclosure is not limited to that—the information could be provided on demand, during operation of a system of the present disclosure, or in any other suitable fashion. Furthermore, this information for each supplier could vary by product type, so one set of data may be used for sheet metal parts and a separate set of data may be used for plastic parts, among others. Note also that while standard production data 322 and expedited production data 324 are shown separately, in practice they could be stored in the same data structure or table. Furthermore, in practice, supplier production data 322 may also include other information for each supplier, such as name and location and other data from which supplier prices may be calculated by the pricing modules if the prices are not directly stated (such as one or more labor costs, set-up costs, shipping costs, and/or other supplier pricing data).

The supplier parameter module 320A may also include expedited production purchase data 326. This may be a listing, by customer, of the expedited purchasing options that are active. This data includes a specification of whether they have an active option, along with characterizing what type of option may be active (see the discussion above for different types of options contemplated). In some embodiments, this data could include an identification, by particular manufacturing processes, of whether/what type and/or timing option is active.

As shown in FIG. 3, the pricing module 320B may include an operation calculation module 328, which may receive the output of the interrogator 318 to determine which manufacturing processes are required to manufacture the object described in a given 3D computer model 316 and the output from supplier parameter module 320A to determine (i) whether and what types of expedited production options may be available as a function of expedited production purchase data 326 and (ii) based on that determination, whether standard processes and associated prices (from standard production data 322) or expedited processes and associated prices 324 (from expedited production data 324) are applicable. The pricing module 320B may then determine the overall lead time and associated prices for the product to be manufactured. Continuing the example discussed above for interrogator 318, the operation calculation module 328 may pull associated prices from the supplier parameter module 320A. In this example, operation calculation module 328 may determine that drilling is listed as an expedited process in expedited production data 324 for a given supplier, for which an expedited lead time E is available, at a price of $Y for drilling per inch into aluminum. The pricing module 320B may then determine a price for those operations, as $X(Y×2.5×N), where X is the number of units, Y is the price for expedited drilling per inch, 2.5 is the thickness of the workpieces in inches, and N is the number of holes to be drilled). In addition to the U.S. patent applications listed above, additional illustrative embodiments for this aspect of the pricing module 320B may be found in U.S. patent application Ser. No. 14/928,001, filed on Oct. 30, 2015, and titled "METHODS AND SOFTWARE FOR A PRICING-METHOD-AGNOSTIC ECOMMERCE MARKETPLACE FOR MANUFACTURING SERVICES" the teachings of which, and particularly those set forth in FIGS. 3-8 and the accompanying specification, are incorporated by reference herein. These results (identifying the supplier, the price for manufacture of the ordered product, and the associated lead time) may be indicated to a user via GUI 312.

3D computer models typically contain a plethora of data but do not store the data in such a way that pricing information can be derived directly therefrom. To cure this deficiency, interrogator 318 can pull data (e.g., material type) from the 3D computer model and may provide it to a pricing engine such as pricing module 320B, reformat the data for the pricing module 320B and then provide the reformatted data to the pricing module 320B and/or interpret the data into new data specifically for the pricing module 320B and then provide the new data to the pricing module 320B. Accordingly, the pricing module 320B may use specific data in specific formats in formulas to calculate pricing.

Interpreting data into new data may involve one or more of any number of functions and/or operations. For example, for a sheet metal part, a 3D computer model may include a variety of information regarding a bend. However, it may be useful for a pricing engine to have access to information specifying how many unique bends there are with different bend lengths and the quantity of bends for each unique bend length. To determine such information, interrogator 318 may query each bend in the 3D computer model, establish a table of bend lengths, and determine a sum of bend lengths, for example, for each bend of a common bend length. This can be important for the pricing module 320B because each unique bend length involves a certain amount of set-up time and therefore a different price. In the case of ten bends all of the same bend length, there may only be one set-up charge applied. In the case of ten bends each with a unique bend length, there might be ten set-up charges applied, depending upon the algorithms of the pricing engine.

Another sheet metal example is "Hole Too Close To An Edge" (HOLE). CAD programs and 3D computer models typically do not store this information in the 3D computer model. However, a HOLE can cause manufacturing issues (e.g., it can deform surrounding material and, in the case of a diameter, the diameter may become oblong) if it is, for example, less than four times the material thickness away from the bend. Therefore interrogator 318 can be programmed to check the distance from any hole to the closest bend, divide it by the material and create a true/false flag as a function of the result. The true/false flag can then trigger pricing module 320B to calculate the price differently than it might otherwise.

Yet another sheet metal example is that a punched hole diameter typically needs to be the same or greater than the material thickness. If it is not, a second operation may be required to manufacture the hole, resulting in more time spent to create the hole than if it could simply be punched. Interrogator 318 may be programmed to check for this situation and create a true/false flag depending upon the result. Pricing module 320B may then utilize this true/false flag in determining a price, whereas without such a true/false flag the pricing engine may underprice holes with a diameter less than the material thickness of the associated material.

A generic example that would be relevant to such processes as sheet metal, machining, and injection molding is whether a hole extends through a part or only extends partially into the part. The result may affect manufacturing costs, as, for example, a non-through hole in sheet metal requires another operation (e.g., machining) to create the hole. CAD programs and 3D computer models may not specify whether a hole extends through associated material. In some CAD programs, given a sheet with a thickness, to put a hole in the sheet, a user may create a cylinder and define one or more Boolean operations to subtract the cylinder from the sheet; under these conditions, there may not be any explicit information in the 3D computer model regarding whether the hole extends through the sheet. In this case, interrogator 318 can be programmed to analyze the maximum material thickness for the hole and compare it to the geometry modeled to cut the hole, creating a resultant true/false flag that may be utilized by pricing module 320B in determining a price.

Figure 4:
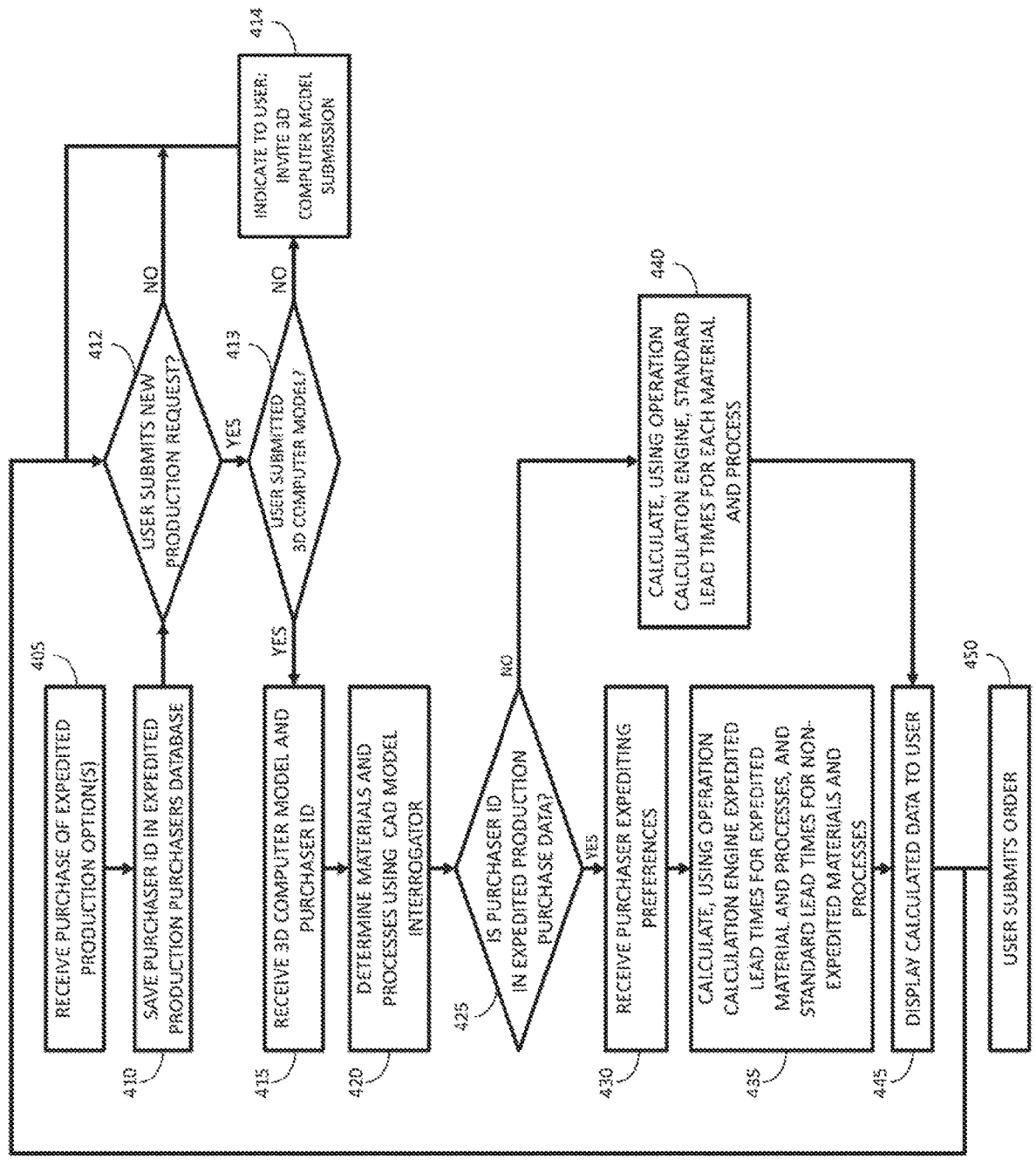
FIG. 4 is a flowchart depicting a method of processing production requests in accordance with an embodiment of the present disclosure.

FIG. 4 is a more detailed flowchart of an overall method of the present disclosure, which will be discussed with reference to FIG. 3. In connection with step 405, a user purchases an expedited production option, which may be one or more of the expedited production options previously described. The user could be purchasing the option for themselves as an individual or they could be purchasing it on behalf of a company or other entity. Additionally or alternatively, the option could apply to particular purchasing agents within an organization. As will be clear to a person of skill in the art, the option could be purchased by any entity on behalf of any entity. At step 405, purchase of an expedited production option is received by one or more components of one or more systems of the present disclosure. At step 410, an identification of the user, along with an identification of the expedited production option they have chosen and the time period for which it may be effective, may be saved in the expedited production purchase data 326. Then, in step 412, one or more components of a system of the present disclosure may detect whether a user has submitted a price or production request at GUI 312. If so, in step 413 the system may determine whether there is a 3D computer model 316 associated with the request; if not, at step 414 the system may so indicate to the user by appropriate messaging at GUI 312, including an option for a user to either submit a new 3D computer model 316 or associate the pending request to a 3D computer model 316 that has been previously stored. The process may then loop back to step 412 to determine whether the user has withdrawn their request; presumptively, if the user's request is still active, the user has now provided, or identified, the 3D computer model 316 that is subject to the request.

The process may continue to step 415, where the selected 3D computer model 316, along with the identification of the party submitting the order, may be read by a program of the present disclosure. In step 420 interrogator 318 of the purchaser module 310 may parse the identified 3D computer model 316 to identify the processes required to manufacture the modeled object, in a manner like that described above. At step 425, the purchaser identification read in step 415 may be compared to the expedited production purchase data 326 to determine whether that purchaser has a valid and applicable expedited production option. If not, in step 440 the operation calculation module 328 may pull the supplier data from 322 for standard lead times and standard prices for all the processes identified by interrogator 318. However, if so, in step 435 the operation calculation module 328 may pull the supplier data from 322 and 324 for standard lead time and standard prices and eligible ones of the processes that have expedited lead times and expedited prices for all the processes identified by interrogator 318. Note, however, as described above in the context of FIG. 1, that calculation steps 435 and/or 440 may involve additional and/or alternative implementations. For example, steps 435 and/or 440 may include comparisons of a user-submitted 3D computer model to other 3D computer models, analysis of a user-submitted 3D computer model to identify whether one or more aspects of the 3D computer model are in compliance with one or more expedited production options and/or best manufacturing practices, and/or offering one or more expedited production options to the user or otherwise providing one or more notifications to the user, among other alternative implementations that will become apparent to those of ordinary skill after reading this disclosure in its entirety. In step 445, the results from step 440 or step 435, as applicable, may be displayed to the user at GUI 312, and the user may optionally then use the displayed information at step 450 to order the product in question. The process may then loop back to step 412 to process a new production request.

Further, an optional step 430 of the process of FIG. 4 may be performed by which a user who has a valid expedited production option applicable to particular processes can select which of those processes will be expedited. In this manner, the user may be provided with the opportunity to select, for a given product, which processes will be expedited and which will not. Referring back to the example of FIG. 2, the silk screen process of 208AE may have an expedited lead time of one day, the chromate plating process of 208BE may have an expedited lead time of a half day, and the particular expedited processing option the user has selected or purchased may enable the user to specify which processes will be expedited. In this example, a user might choose to expedite the silk screen process 208AE but may be concerned about potential consequences associated with expediting the chromate plating process 208BE such that the user elects to apply a standard lead time process 208BS for the plating process instead of expediting it.

Figure 5:
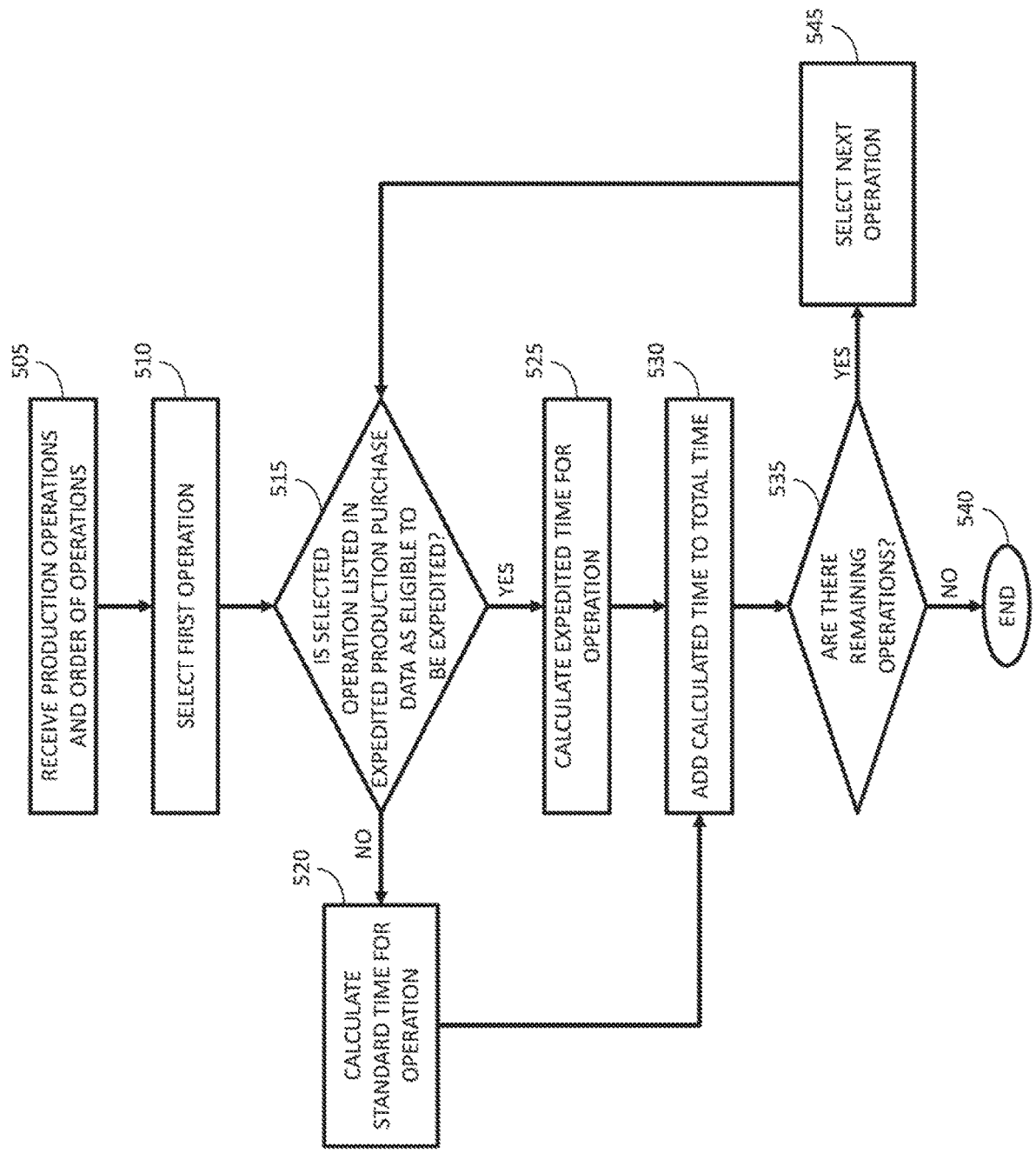
FIG. 5 is a flowchart depicting a method of calculating production time in accordance with an embodiment of the present disclosure.

FIG. 5 is a more detailed flowchart of step 435 of FIG. 4. As discussed above, the interrogator 318 may provide the expedition module 320 with a listing of processes and/or other aspects or factors associated with manufacturing a structure defined in a 3D computer model. In step 505, the listing of processes and/or other factors may be received. If the listing is of the total sequence of processes, step by step, in this step 505 the sequence can be re-expressed by identifying the different processes and the number of times they occur. So, by way of example, if the sequence of operations includes a cutting process followed by a bending process followed by another cutting process, the process may be re-expressed as 2 cutting processes and one bending process. In step 510 the "first" operation may be selected for analysis. Again, this could be either the first process in the sequence of steps used to manufacture the object in question or it could be the process that is used the most often in the process, among others.

In step 515 the operation calculation module 328 determines whether the selected operation is listed in the expedited production data 324 as an expedited process. If not, in step 520 the standard lead time and associated price for that operation from standard production data 322 may be used to calculate the total lead time and price for that operation. If so, in step 525 the expedited lead time and associated price for that operation from expedited production data 324 may be used to calculate the total lead time and price for that operation. However, similar to the discussions above with respect to FIG. 1 and step 435 of FIG. 4, step 515 may include one or more comparisons of a user-submitted 3D computer model and/or aspects thereof identified by interrogator 318 to one or more other 3D computer models (e.g., those representing parts or assemblies that have already been manufactured and are stored in a warehouse or for which a mold has already been created), to specifications of one or more expedited production options that a user has purchased or may purchase, and/or to one or more data sets specifying ranges and limitations of best manufacturing practices, among other comparisons, as discussed above. Further, step 515 may include advising a user as discussed above in the context of FIG. 1 and/or offering a user one or more expedited production options for purchase, when appropriate and/or applicable. The outputs of steps 520 or 525, as applicable, may be used to calculate the total lead time at step 530. At step 535 one or more components of a system of the present disclosure determines whether there are other processes to be analyzed and, if not, the process may end at step 540. If there are other processes to be analyzed, the next operation may be selected for analysis at step 545 and the process may return to step 515.

In some embodiments, an expedited production option may ensure that the purchaser will always receive a lead time reduction of, for example, 20% compared to standard lead times. In this instance, instead of selecting between standard processes from standard production data 322 and expedited processes from expedited production data 324, both sets of data may be pulled and total lead time may be calculated for both standard processes and expedited processes. At the end of the operation the two totals may be compared to one another to ensure that the expedited lead time result is at least 20% better than the standard lead time result. Additionally or alternatively, data may be included with each expedited process indicating relative degrees of difficulty to achieve the expedited lead time, for example, on a scale of 1-4 with 4 being the most difficult to achieve. If as a result of the foregoing calculation the total expedited process lead time is, for example, 30% faster than standard lead time, but the purchaser has only paid for a 20% lead time improvement, expedited lead time processes can be dropped in favor of their standard lead time counterparts in order of most difficult process to expedite to least difficult until the differential approaches a 20% lead time improvement.

FIG. 6 is a table illustrating an example of standard production data 322 and expedited production data 324. As previously stated, this data may be stored for each of Suppler 1, Suppler 2, and up to any number of suppliers, indicated as Supplier N. In this example, for ease of illustration, this data table includes both standard production data R322 (top six rows) and expedited production data R324 (lower two rows). This data is consistent with the expedited production options described above that are limited to expediting one or both of base lead time and additional time due to quantity, as described above with reference to FIG. 2. The upper section of the data table, illustrating standard production data 322, is a listing of the setup time per operation and the run time per operation/unit for all the processes that cannot be expedited 208A-208F (and therefore, only standard lead times are illustrated). "Setup time" refers to the amount of time between the workpieces arriving at a given manufacturing production tool and the commencement of operations on the first of the workpieces. This is primarily a measurement of the amount of time it takes to set up the tool for production for a given run of workpieces. The "run time per operation" is the amount of time it takes to run the process on a given workpiece. Note that setup time occurs once, at the start of a production run, while run time per operation is expressed on a per unit basis because it repeats for all the workpieces in the production run. In the last column, entitled "$ per hour (standard)," a price is included, expressed per hour, that varies from one operation to the next as a function of the nature of the operation in question. The lower section of the data table, illustrating expedited production data R324, sets forth the data 204 and 206 as discussed above with reference to FIG. 2, indicating standard and expedited lead times for base lead time and quantity.

In operation, the operation calculation module 328 may receive data R322 and R324 and determine the total lead time as a function of that data. The operation calculation module 328 may also receive data from the purchase program 310 indicating the quantity of product to be manufactured and data from the interrogator 318 to determine which processes should be included in the calculation. It may then add up all the applicable setup times and all the applicable run times (which may be run time per operation, multiplied by the number of units to be manufactured), and then add the base lead time 204 and the additional time due to quantity 206 to determine the total lead time, which may be rounded up to the next whole day. Working from the example of FIG. 6, and for ease of illustration, assume all the processes 208A-208E are used once to manufacture a given product; assume 3,000 units will be manufactured; and assume the applicable expedited production option includes both the expedited base lead time 204E (of 5 days) and the expedited additional time due to expedited quantity 206E (of 2 days). The operation calculation module may then determine total lead time as:

> 47.5 minutes [total setup time]+4125 minutes [total run time, for 3,000 units]=4175.5 minutes=8.69 days [assuming 8 hour production days], rounded up to 9 days,+5 days [expedited base lead time]+2 days [expedited additional time due to quantity]=16 days total lead time Note that the calculation above assumes 8 hour production days. In some embodiments, a purchaser's expedited production option could entitle it to 12, 18, or 24 manufacturing hours per day, in which case (in the example above) the resulting total lead times would be 13 days, 11 days, or 10 days, respectively.

FIG. 7 presents another example of the standard production data 324 and expedited production data 326. While an example is set forth only for Supplier 1, as in FIG. 6 a separate set of similar data may be stored for Supplier 2 and up to any number of suppliers. The data in the first three columns of FIG. 7 is the same as the corresponding data in the first three columns of FIG. 6, and are generally designated as standard production data C324. Note the next column, designated C326, lists prices for all manufacturing operations for which an expedited lead time is available. These figures can be listed as in FIG. 7 (total price per operation, when expedited) or as an additional charge to the charges for standard lead times for the respective operations, as listed in the immediately preceding column (so, for Operation 1, row C326 can be either "150" as shown, or "40," indicating the increase from the "110" entry in the immediately preceding column). For Operation 5, no expedited lead time is available; that status is reflected by the entry "N/A," meaning the standard price per hour would be applied. For Operations 1-4 and 6 expedited lead times are available at the prices indicated. As previously described, in an embodiment of the present disclosure a purchaser having an expedited production option may be given the option to select (amongst all of the operations that can be expedited) which operations will be expedited. In another embodiment of the present disclosure, the purchaser has an expedited production option of $X total, and the differential between standard rates and expedited rates may be applied against that total $X until it is exceeded. In yet another embodiment of the present disclosure, these "expedited" lead time charges do not correspond to reductions in the actual lead times for the associated processes. Rather, they refer to an allocation of additional charges for expedited lead time charges, allocated as a function of the complexity of the process or its relative importance.

FIG. 7 includes two other optional entries. The first, designated C326A, is for "priority" lead time orders, which may be shorter than those normally available for expedited lead times. In an embodiment of the present disclosure, this capability may be provided to purchasers who want to acquire a "premium" expedited production option, by which they may be entitled to even shorter lead times than may be available under the regular expedited production options. Note that in the row C326A, the priority expedited production option is not available for Operation 5, as it is not the type of process that can be expedited. Note that the priority expedited production option is also not available for Operation 3, even though the expedited production option C326 was available for that option. For those embodiments of the present disclosure where these lead time premiums correspond to reductions in the lead time of the associated processes, the purpose of this example is to illustrate that while the lead time for some processes may be subject to reduction, it may be that they cannot be reduced sufficiently to qualify as a premium lead time reduction. Finally, FIG. 7 includes a separate "notes" section 702, where user-indicated preferences may be represented on a per-process basis. So in this example, for Operation 1, the user has indicated that they do not want that process expedited if the additional charge is more than $50/hour. As such, if a regular expedited production option is available, that process may be expedited if the additional charge is $40/hour; however, if a premium expedited production option is available, that process may not be selected for premium expedition if the additional charge is more than $50/hour.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
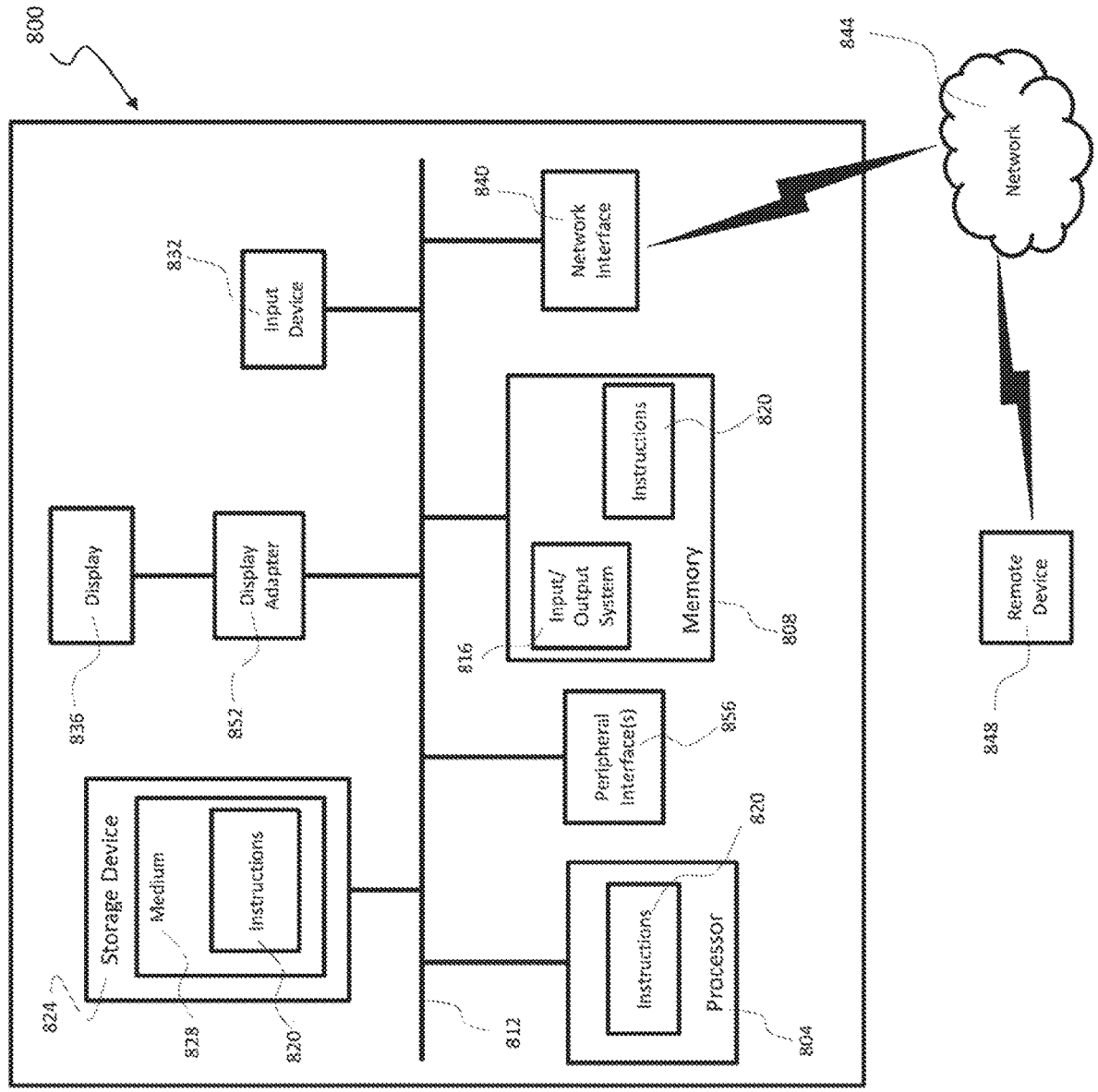
FIG. 8 is a block diagram view of a system that is controlled in accordance with an embodiment of the present disclosure.

FIG. 8 shows a diagrammatic representation of one embodiment of a computing device in the exemplary form of a computer system 800 within which a set of instructions for causing a control system, such as the system of FIG. 3, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine readable media) including, but not limited to, a random access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

In operation, the databases of the supplier parameter module 320A can be stored on a storage device associated with the computer of FIG. 8 (such as in storage device 824) or on storage devices that are the same as those of storage device 824, except on a remote device 848 accessed through the network 844 via the network interface 840 (such as may be the case when using a cloud-based database). Alternatively, aspects of the present disclosure can be implemented in a software-as-a-service through a cloud connection, in which case the user may enter user input data via a GUI 312 that is provided on a remote device 848, and where the remaining portions of the software system are resident on the storage device 824 of a central (cloud) server 800, and such that the inputs are supplied via network 844 and network interface 840 to a central server device 800, the inputs causing the processor to execute one or more sets of program instructions in accordance with aspects of the present disclosure that may be resident in central storage 828.

The foregoing has been a detailed description of illustrative embodiments of the invention. Various modifications and additions can be made without departing from the spirit and scope of this invention. While the invention has been described with reference to a CAD design, the principles of the invention are applicable to other types of programs for which products may be ordered based on a particular product design, including but not limited programs for enterprise resource planning (ERP), materials requirements planning (MRP), product lifecycle management (PLM), and customer relationship management (CRM) ordering systems. For example, one or more of these systems may process a request for manufacture, which may comprise or merely consist of a pricing request. In other words, instead of being embedded in a CAD tool, aspects of the invention could be embedded in these other types of systems that manage production, such as the manufacture of apparel. Both sheet metal and apparel designers use CAD systems to design their products, using sheets of flat, material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. Purchased components (in some cases, identical purchased components) may be added to the design. CAD programs may be used to visualize the shape of the finished product. In both sheet metal and apparel manufacturing the sheet (metal or fabric) may be cut or stamped by a variety of methods using computerized machines. Units are moved from station to station during manufacture. Where sheet metal is connected by rivets or welding, sheet fabric is connected by stitching or gluing. Surface finishes may be applied to both; both may be painted, silk-screened, or otherwise covered with a protective substance.

Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. All of the data values presented in the present disclosure are given by way of example only, and are not to be interpreted as limitations on the invention or its various embodiments. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of enabling expedited manufacture of one or more instantiations of a structure modeled as a 3D computer model, the method implemented on one or more computer devices and comprising:
   displaying, by the one or more computer devices, to a user one or more user selectable expedited manufacturing reservation options for a plurality of requests for manufacture;
   prompting, by the one or more computer devices, the user to select one of the user selectable expedited manufacturing reservation options from among the one or more displayed;
   receiving, at the one or more computer devices, an expedited manufacturing reservation, wherein the reservation is applicable to a plurality of requests for manufacture;
   storing, at the one or more computer devices, the expedited manufacturing reservation;
   receiving, at the one or more computer devices, a request for manufacture of one or more instantiations of a structure modeled in an associated 3D computer model from a user;
   receiving, at the one or more computer devices, a first requirement, the first requirement including a material, dimension, or tolerance requirement from a user;
   automatedly comparing, via at least one of the one or more computer devices, one or more of the requests for manufacture and one or more aspects of the associated 3D computer model with the expedited manufacturing reservation, wherein comparing further comprises:
      interrogating the associated 3D computer model;
      determining as a function of the interrogation, a second requirement, the second requirement including a material, dimension, or tolerance requirement for manufacturing the structure; and
      comparing at least one of the first requirement or the second requirement determined from interrogating the associated 3D computer model to a material, dimension, or tolerance requirement in the expedited manufacturing reservation;
   determining, via the one or more computer devices and as function of the automated comparing, whether the expedited manufacturing reservation is applicable to the request for manufacture;
   calculating, via at least one of the one or more computer devices, total time to complete the request for manufacture; and
   presenting, via at least one of the one or more computer devices, the total time to complete the request for manufacture.

2. A method according to claim 1, further comprising receiving a confirmation of the request for manufacture from the user and storing, on at least one of the one or more computer devices, information in connection with the request for manufacture to expedite manufacture of one or more instantiations of the structure in accordance with the reservation when the expedited manufacturing reservation is applicable to the request for manufacture.

3. A method according to claim 1, further comprising automatedly advising or notifying the user as a function of a result of the comparing.

4. A method according to claim 3, wherein advising or notifying the user includes offering one or more expedited manufacturing reservations to the user for purchase.

5. A method according to claim 4, wherein the one or more expedited manufacturing reservations are determined as a function of a result of the comparing.

6. A method according to claim 1, further comprising comparing one or more aspects of the associated 3D computer model with one or more data sets specifying best manufacturing practices.

7. A method according to claim 1, further comprising comparing one or more aspects of the associated 3D computer model with one or more 3D computer models associated with structures that have already been manufactured.

8. A method according to claim 7, further comprising offering an expedited manufacturing reservation to the user at a discounted rate or free of charge if one or more aspects of the associated 3D computer model is identical to a 3D computer model associated with a structure that has already been manufactured.

9. A method according to claim 1, further comprising comparing one or more aspects of the associated 3D computer model with one or more 3D computer models associated with structures for which molds have already been manufactured.

10. A method according to claim 1, further comprising comparing the associated 3D computer model with one or more 3D computer models associated with structures that have already been manufactured.

11. A method according to claim 1, wherein the expedited manufacturing reservation specifies a duration of time for which it remains effective.

12. A method according to claim 1, wherein the expedited manufacturing reservation specifies a monetary limit up to which it applies.

13. A method according to claim 12, further comprising limiting applicability of the expedited manufacturing reservation to requests having cumulative charges that are within the monetary limit.

14. A method according to claim 1, further comprising: if the expedited manufacturing reservation is applicable to the request, displaying a listing of one or more processes of the manufacture that may be expedited to the user.

15. A method according to claim 14, further comprising receiving an indication of which of the processes are to be expedited from the user, wherein remaining ones of the processes are not expedited.

16. A method according to claim 14, further comprising receiving an indication of which of the processes are to be expedited and to what extent the selected processes are to be expedited from the user.

17. A method according to claim 1, wherein the request for manufacture requires one or more materials or operations and the materials or operations are analyzed to determine which are eligible for expediting.

18. A method according to claim 1, further comprising identifying one or more aspects of the associated 3D computer model that may require a manufacturing process incompatible with the expedited manufacturing reservation and presenting the user with an option to proceed with a modified expedited manufacturing reservation.

19. A method according to claim 1, further comprising identifying one or more aspects of the associated 3D computer model that may by incompatible with best manufacturing practices and presenting the user with options to proceed or cancel.

20. A method of enabling expedited manufacture of one or more instantiations of a structure modeled as a 3D computer model, the method implemented on one or more computer devices and comprising:

displaying, by the one or more computer devices, to a user one or more user selectable expedited manufacturing reservation options for a plurality of requests for manufacture;

prompting, by the one or more computer devices, the user to select one of the user selectable expedited manufacturing reservation options from among the one or more displayed;

receiving, at the one or more computer devices, an expedited manufacturing reservation, wherein the reservation is applicable to a plurality of requests for manufacture;

storing, at the one or more computer devices, the expedited manufacturing reservation;

receiving, at the one or more computer devices, a request for manufacture of one or more instantiations of a structure modeled in an associated 3D computer model from a user;

receiving, at the one or more computer devices, a first material, dimension, or tolerance requirement from a user;

automatedly comparing, via at least one of the one or more computer devices, one or more of the requests for manufacture and one or more aspects of the associated 3D computer model with the expedited manufacturing reservation, wherein comparing further comprises:

interrogating the associated 3D computer model;

determining as a function of the interrogation, a second material, dimension, or tolerance requirement for manufacturing the structure; and comparing at least one of the first material, dimension, or tolerance requirement and the second material, dimension, or tolerance requirement determined from interrogating the associated 3D computer model to a material, dimension, or tolerance requirement in the expedited manufacturing reservation;

determining, via the one or more computer devices and as function of the automated comparing, whether the expedited manufacturing reservation is applicable to the request for manufacture;

calculating, via at least one of the one or more computer devices, total time to complete the request for manufacture; and storing, on at least one of the one or more computer devices, information in connection with the request for manufacture to expedite manufacture of one or more instantiations of the structure in accordance with the reservation when the expedited manufacturing reservation is applicable to the request for manufacture.

\* \* \* \* \*